United States Patent
Wang et al.

(10) Patent No.: US 11,635,784 B2
(45) Date of Patent: Apr. 25, 2023

(54) FOLDABLE SUPPORT, FABRICATING METHOD THEREOF AND DISPLAY DEVICE

(71) Applicant: BOE TECHNOLOGY GROUP CO., LTD., Beijing (CN)

(72) Inventors: Haoran Wang, Beijing (CN); Fangxu Cao, Beijing (CN); Liming Dong, Beijing (CN); Yonghong Zhou, Beijing (CN); Xucong Wang, Beijing (CN); Benlian Wang, Beijing (CN); Weinan Dai, Beijing (CN); Dengyu Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 321 days.

(21) Appl. No.: 16/815,394

(22) Filed: Mar. 11, 2020

(65) Prior Publication Data

US 2021/0165447 A1 Jun. 3, 2021

(30) Foreign Application Priority Data

Nov. 28, 2019 (CN) .......................... 201911194976.6

(51) Int. Cl.
*G06F 1/16* (2006.01)

(52) U.S. Cl.
CPC .......... *G06F 1/1616* (2013.01); *G06F 1/1652* (2013.01)

(58) Field of Classification Search
CPC .............................. G06F 1/1616; G06F 1/1652
See application file for complete search history.

(56) References Cited

U.S. PATENT DOCUMENTS

| 2016/0118616 | A1* | 4/2016 | Hiroki | H01L 51/525 |
| | | | | 257/40 |
| 2016/0172623 | A1* | 6/2016 | Lee | B32B 7/12 |
| | | | | 257/40 |
| 2018/0124931 | A1* | 5/2018 | Choi | G09F 9/301 |
| 2021/0325929 | A1* | 10/2021 | Cai | B32B 27/281 |

FOREIGN PATENT DOCUMENTS

| CN | 208596323 U | 3/2019 | |
| CN | 109903679 A | 6/2019 | |
| CN | 110062077 A * | 7/2019 | ............ H04M 1/026 |
| CN | 110062077 A | 7/2019 | |
| CN | 209418505 U * | 9/2019 | |
| CN | 110336903 A | 10/2019 | |
| KR | 20180030301 A | 3/2018 | |

OTHER PUBLICATIONS

First Office Action for CN Patent Application No. 201911194976.6 dated Feb. 3, 2021.

* cited by examiner

*Primary Examiner* — Hoa C Nguyen
(74) *Attorney, Agent, or Firm* — Perilla Knox & Hildebrandt LLP; Kenneth A. Knox

(57) ABSTRACT

The present disclosure provides a foldable support, fabricating method thereof, and a display device. The foldable support includes a metal layer having a non-bending region and at least one bending region, where the metal layer includes a plurality of recessed portions at the at least one bending region, and at least one of sidewalls of the plurality of recessed portions is not perpendicular to a plane where the metal layer is located.

16 Claims, 5 Drawing Sheets

FOLDABLE SUPPORT, FABRICATING METHOD THEREOF AND DISPLAY DEVICE

CROSS REFERENCE TO RELATED APPLICATION

This application is based upon, and claims the benefit of and priority to, Chinese Patent Application No. 201911194976.6, filed on Nov. 28, 2019, the entire contents thereof being incorporated herein by reference.

TECHNICAL FIELD

The present disclosure relates to the field of display technology and, in particular, to a foldable support, a fabricating method thereof, and a display device.

BACKGROUND

With the diversification of flexible display products, foldable display products are favored by users due to their portability and large size expansion. Existing foldable display products are based on a flexible material, which enables the folding display product to achieve a bending effect. The flexible substrate is prone to appearance defects such as creep and irregular curl in a high temperature environment, which affects the realization of the foldable display and also affects the normal display of the display product. Therefore, currently, a foldable support is usually provided on the back of a flexible display panel to support the flexible display panel.

However, current foldable supports need to be improved.

SUMMARY

In one aspect of the present disclosure, the present disclosure provides a foldable support. The foldable support includes: a metal layer, which is provided with a non-bending region and at least one bending region, where the metal layer comprises a plurality of recessed portions at the at least one bending region, and at least one of sidewalls of the plurality of recessed portions is not perpendicular to a plane where the metal layer is located. Thus, the foldable support can provide a good flat support function for the flexible display panel, in particular, provide good support for the bending region of the flexible display panel, improve the overall resistance of the flexible display panel against crushing, and meanwhile, the bending performance of the foldable support and the performance of restoring flatness after bending are also effectively improved, which can effectively improve the problem of the peeling between the flexible display panel and the foldable support and improve the folds of the foldable support problem.

According to an embodiment of the present disclosure, the recessed portions are configured to extend through the metal layer. Therefore, the recessed portions have a longer stress release path, which can improve the ability of the metal layer to release stress.

According to an embodiment of the present disclosure, a depth of the recessed portions is smaller than a thickness of the metal layer.

According to an embodiment of the present disclosure, an included angle α between the sidewalls of the recessed portions and the plane where the metal layer is located satisfying: 20 degrees≤α<90 degrees; or, 90 degrees<α≤160 degrees. Therefore, on one hand, the problem of stress concentration during bending of the metal layer can be effectively improved, and the bending performance of the metal layer and the performance of restoring the flatness after bending can be improved. On the other hand, the foldable support is easy to fabricate.

According to an embodiment of the present disclosure, the sidewalls of the recessed portions are provided with at least one convex structure. Therefore, the path of stress release of the metal layer can be further increased, and the ability of the metal layer to disperse stress is further improved.

According to an embodiment of the present disclosure, the recessed portions satisfies at least one of the following conditions: a minimum value of a cross-sectional width of one recessed portion is 0.1 to 1 mm. a cross-sectional shape of the recessed portions includes at least one of a circle, an oval and a polygon. Therefore, the foldable support can obtain a good bending effect and, at the same time, it can provide a flat support for the flexible display panel.

According to an embodiment of the present disclosure, a material constituting the metal layer includes at least one of special steel, nickel, titanium, nickel alloy, titanium alloy, and copper alloy. Therefore, the foldable support can have good support performance.

According to an embodiment of the present disclosure, a thickness of the metal layer is 0.015-0.5 mm. Therefore, the foldable support can obtain a good bending effect.

According to an embodiment of the present disclosure, the foldable support further includes: a buffer structure, where at least a portion of which is located in the recessed portions. Therefore, the bending performance of the foldable support and performance of restoring the flatness after bending can be improved.

According to an embodiment of the present disclosure, the plurality of recessed portions are arranged in a plurality of rows, where two adjacent rows of the plurality of recessed portions are staggered and two rows of the plurality of recessed portions arranged in alternate rows are aligned. Therefore, while ensuring that the foldable support obtains a good bending effect, it can also ensure that the foldable support has a high mechanical strength.

In another aspect of the present disclosure, the present disclosure provides a method for fabricating the above described foldable support. According to an embodiment of the present disclosure, the method includes: providing a metal layer blank, where the metal layer blank is provided with a non-bending region and at least one bending region; and performing a patterned opening process on a portion located at the bending region of the metal layer blank to form a plurality of recessed portions, where at least one of sidewalls of the recessed portions is not perpendicular to a plane where the metal layer is located. Therefore, a simple method can be used to obtain a foldable support having good supporting performance, bending performance, and strong recovery performance after bending.

In another aspect of the present disclosure, the present disclosure provides a display device. According to an embodiment of the present disclosure, the display device includes a flexible display panel and a foldable support. The foldable support is described above, where the foldable support is located on a side facing away from the display surface of the flexible display panel. Therefore, the display device has all the features and advantages of the foldable support described above, and are not repeated here. In general, the display device has a good folding effect and a display effect.

According to an embodiment of the present disclosure, the display device further includes a flat layer disposed between the foldable support and the flexible display panel. Therefore, the flat layer can provide a flat contact surface for the flexible display panel, and avoid the uneven structure of the bending region of the foldable support from adversely affecting the display effect of the flexible display panel.

According to an embodiment of the present disclosure, the recessed portions are configured to extend through the metal layer, where a side with a smaller cross-sectional area of the recessed portions is disposed near the flexible display panel. Alternatively, a depth of the recessed portions is smaller than a thickness of the metal layer, and one side of the metal layer where the recessed portions are located is disposed away from the flexible display panel. Therefore, the foldable support can provide a larger support surface for the flexible display panel, and the flexible display panel can have a smaller amount of deformation under the same stress, which further improves the folding effect and display effect of the display device.

According to an embodiment of the present disclosure, the metal layer is provided with a first surface and a second surface, where the first surface is disposed near the flexible display panel, and the second surface is disposed away from the flexible display panel. An included angle between the sidewalls of the recessed portions and the first surface is a rounded corner. If the included angle between the sidewall of the recessed portion and the first surface is sharp, it is easy to form a top mark or even a scratch on the area of flexible display panel corresponding to this part during bending, which affects the display of the flexible display panel. The present disclosure can effectively improve the above problems by arranging the included angle as a rounded corner.

According to an embodiment of the present disclosure, the flexible display having a non-bending region and at least one bending region, where an orthographic projection of the at least one bending region of the flexible display panel on the metal layer is within the range of an orthographic projection of the bending region of the metal layer on the metal layer. Therefore, it is possible to ensure that the bending of the foldable support matches the bending of the flexible display panel, and at the same time, it has a good supporting effect on the flexible display panel.

BRIEF DESCRIPTION OF THE DRAWINGS

The above and/or additional aspects and advantages of the present disclosure will become apparent and easily understood from the description of the embodiments in conjunction with the following drawings, in which.

DETAILED DESCRIPTION

Figure 1:
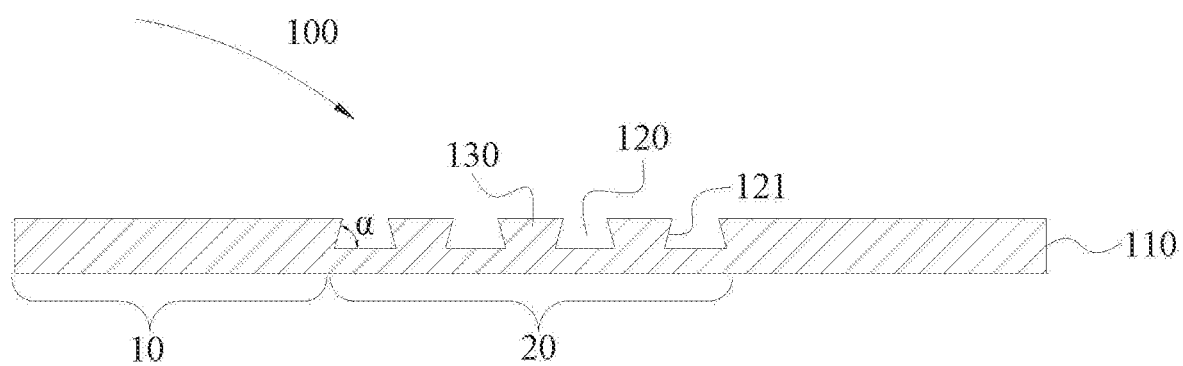
FIG. 1 is a schematic structural diagram of a foldable support according to an embodiment of the present disclosure.

Hereinafter, embodiments of the present disclosure will be described in detail. Examples of the embodiments are shown in the accompanying drawings, wherein the same or similar reference numerals represent the same or similar elements or elements having the same or similar functions from beginning to end. The embodiments described below with reference to the drawings are exemplary and are only used to explain the present disclosure, and should not be construed as limiting the present disclosure.

At present, the supports in foldable display products are usually composed of hard materials. Although the above-mentioned supports have a good supporting effect on the flexible display panel, when the flexible display panel is bent, due to the small deformation of the support, that is, the bending ability of the support is poor, easy peeling between the flexible display panel and the support occurs. In addition, when the flexible display panel is restored from a bent state to a flat state, the support has a poor ability to restore flatness. Also, it is easy to form creases at the bending region, which affects the folding effect and display effect of the flexible display panel.

The present disclosure is intended to at least partially alleviate or solve at least one of the problems mentioned above.

According to one aspect of the present disclosure, the present disclosure provides a foldable support. According to an embodiment of the present disclosure, referring to FIG. 1, the foldable support 100 includes a metal layer 110 having a non-bending region 10 and at least one bending region 20 (only one bending region is shown in the figure), where the metal layer 110 includes a plurality of recessed portions at the at least one bending region 20. At least one of sidewalls 121 of the plurality of recessed portions 120 is not perpendicular to a plane where the metal layer 110 is located.

Therefore, the foldable support can provide a good flat support function for the flexible display panel, in particular, provide good support for the bending region of the flexible display panel, improve the overall resistance of the flexible display panel against crushing, and, meanwhile, the bending performance of the foldable support and the performance of restoring flatness after bending are also effectively improved, which can effectively improve the problem of peeling between the flexible display panel and the foldable support, and improve the folds of the foldable support problem.

It should be noted that the "recessed portion" in the present disclosure refers to a portion having a hole in the metal layer, such as a portion marked 120 in FIG. 1.

In order to facilitate understanding, the working principle of the foldable support according to the embodiment of the present disclosure is briefly described below.

According to an embodiment of the present disclosure, referring to FIG. 1, when a plurality of recessed portions 120 are formed in a portion of the metal layer 110 located at the bending region 20, a plurality of connecting portions 130 are formed simultaneously. There is a recessed portion 120 between two adjacent connecting portions 130, and the sidewalls of the recessed portion 120 are not perpendicular to the plane where the metal layer 110 is located, that is, the sidewall of the recessed portion 120 has a certain slope so that the equivalent width of the connecting portion 130 becomes narrower, the connecting portion 130 has a stronger ability to withstand bending. That is, the portion of the metal layer located at the bending region can release more stress, thereby significantly improving the bending performance of the foldable support and the performance of restoring flatness after bending.

Specifically, the foldable support may be a support that supports a foldable display panel, and the plane in which the metal layer is located may be the plane in which the foldable display panel is located. In other words, the entire metal layer may be a bendable flat plate structure, and the plane in which the metal layer is located may be a surface on either side of the metal layer at the non-bending region, as the first surface 111 or the second surface 112 shown in FIG. 16.

According to an embodiment of the present disclosure, by performing a patterned opening process on a portion of the metal layer 110 located at the bending region 20, a portion of the metal layer 110 located at the bending region 20 has a plurality of recessed portions 120, and at least one of sidewalls 121 of each of the recessed portions 120 is not perpendicular to the plane where the metal layer 110 is located. The recessed portions 120 may be filled with air, or the recessed portions 120 may also be filled with a buffer structure (such as 140 shown in FIG. 10). Therefore, when the foldable support is bent, a plurality of recessed portions can be deformed as the foldable support is bent so that the bending stress can be released. The sidewalls of the recessed portions are not perpendicular to the plane where the metal layer is located, which can further enhance the ability of the recessed portions to release stress, effectively improve the problem of stress concentration when the metal layer is bent, and significantly increase the degree of bending of the foldable support so as to match the degree of bending of the flexible display panel and reduce the risk of peeling of the flexible display panel and the foldable support from each other when the foldable support is restored to a flat state. A plurality of recessed portions can be restored to the original state, thereby improving the performance of the foldable support to be restored to a flat state after being bent so that the foldable support obtains a good bending and unfolding effect. Further, the flexible display panel can obtain a good supporting and the occurrence of folds at the bending region can be effectively alleviated.

Each structure of the foldable support is described in detail according to specific embodiments of the present disclosure.

According to an embodiment of the present disclosure, referring to FIG. 1, all the sidewalls 121 of the recessed portions 120 may not be perpendicular to the plane in which the metal layer 110 is located. Therefore, the foldable support can release more stress during bending, and further improve the performance of bending and the performance of restoring the flatness after bending of the foldable support.

Figure 2:
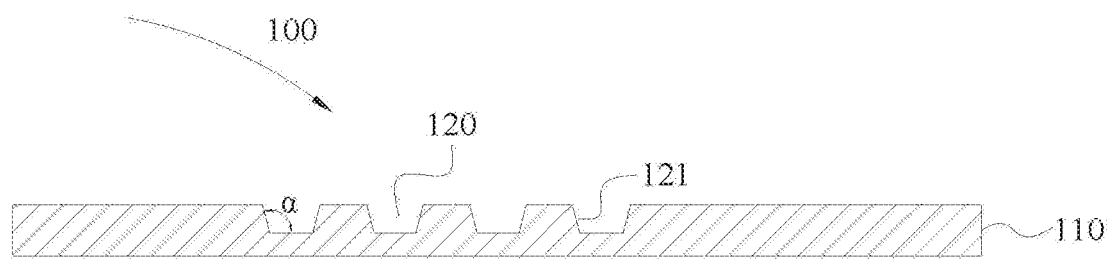
FIG. 2 is a schematic structural diagram of a foldable support according to another embodiment of the present disclosure.
Figure 3:
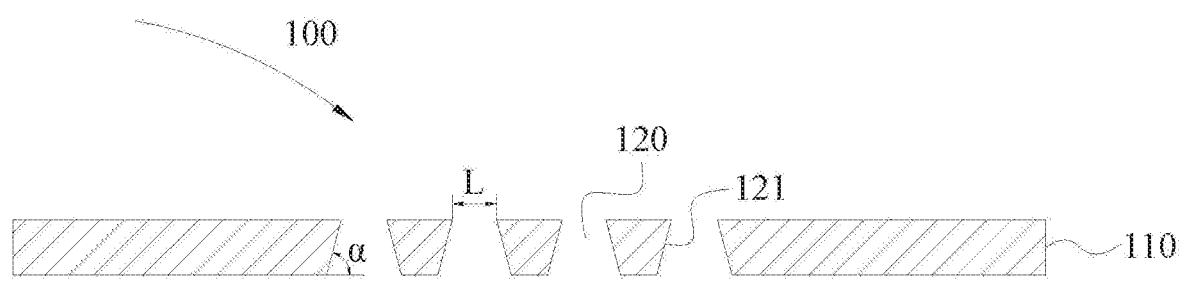
FIG. 3 is a schematic structural diagram of a foldable support according to another embodiment of the present disclosure.
Figure 4:
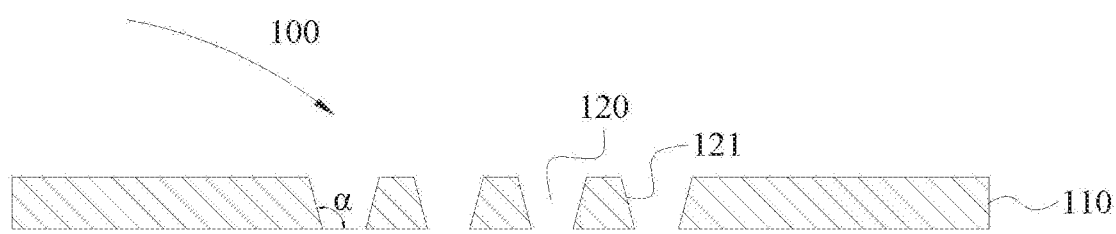
FIG. 4 is a schematic structural diagram of a foldable support according to another embodiment of the present disclosure.

According to an embodiment of the present disclosure, the included angle α between the sidewall 121 of the recessed portion 120 and the plane where the metal layer 110 is located may satisfy: 20 degrees≤α<90 degrees (see FIG. 1 and FIG. 3), or, 90 degrees<α≤160 degrees (see FIG. 2 and FIG. 4). Therefore, the problem of stress concentration during bending of the metal layer can be effectively improved, and the performance of bending and the performance of restoring the flatness after bending of the metal layer can be improved. The above-described foldable support will not only achieve a good outer folding effect, but also can achieve a good inner folding effect. According to a specific embodiment of the present disclosure, the included angle α may be 20 degrees, 30 degrees, 45 degrees, 60 degrees, 70 degrees, and 80 degrees (see the cases of FIG. 1 and FIG. 3), or, the included angle α may be 160 degrees, 150 degrees, 135 degrees, 120 degrees, 110 degrees, and 100 degrees (see the cases of FIG. 2 and FIG. 4). Specifically, the included angle α may be about 45 degrees. On one hand, the recessed portions may have sufficient stress relief capability and, on the other hand, a smaller angle is also convenient for fabricating. According to the embodiment of the present disclosure, the angle of the included angle α can be adjusted to achieve the adjustment of the bending performance of the foldable support and the performance of restoring the flatness after bending. Regarding the specific angle value of the included angle α, those skilled in the art can design according to the degree of bending of the actual product.

According to the embodiment of the present disclosure, the depth of the recessed portions 120 may be smaller than the thickness of the metal layer 110 (see FIG. 1 and FIG. 2), or the recessed portions 120 may further extend through the metal layer 110 (see FIG. 3 and FIG. 4). Therefore, the above described recessed portions can make the foldable support obtain a good bending effect, and when the recessed portions are configured to extend through the metal layer, the recessed portions have a longer stress release path, which can further improve the ability of the metal layer to release stress and further improve the bending effect of the foldable support.

Figure 5:
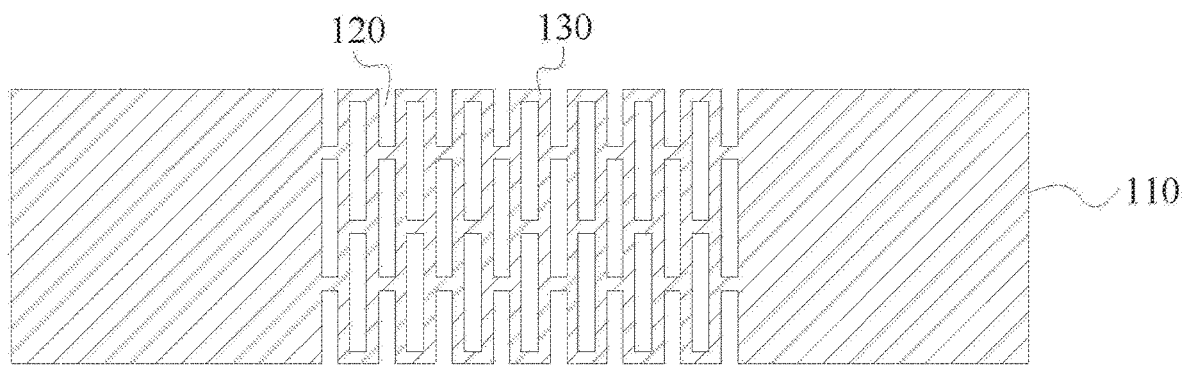
FIG. 5 is a schematic structural diagram of a foldable support according to another embodiment of the present disclosure.

According to an embodiment of the present disclosure, referring to FIG. 5, when the recessed portions are configured to extend through the metal layer, the plurality of connecting portions 130 may be connected to each other, thereby ensuring the integrity of the metal layer. That is, the plurality of recessed portions at this time may be a plurality of hollowed-out regions located at the bending region of the metal layer. Specifically, the plurality of recessed portions 120 are arranged in a plurality of rows, where two adjacent rows of recessed portions 120 are staggered and the two rows of recessed portions 120 arranged in alternate rows are aligned. Therefore, while ensuring that the foldable support obtains a good bending effect, it can also ensure that the foldable support has a high mechanical strength.

According to the embodiment of the present disclosure, on the basis of the sidewalls of the recessed portions having a certain slope, the sidewall(s) of the recessed portion(s) 120 may further have at least one convex structure 1211, or may have at least one recessed structure 1212. Specifically, referring to FIG. 6, the side wall 121 of the recessed portion 120 has one convex structure 1211 so that the path of stress release of the metal layer can be further increased, and the ability of the metal layer to disperse stress is further improved.

Figure 6:
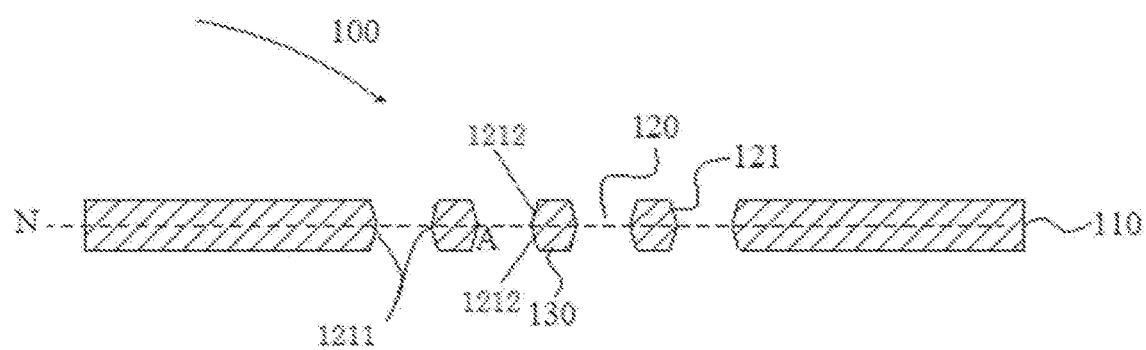
FIG. 6 is a schematic structural diagram of a foldable support according to another embodiment of the present disclosure.
Figure 7:
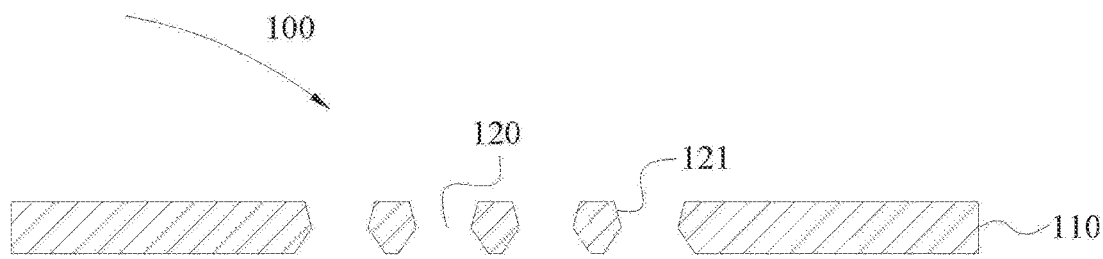
FIG. 7 is a schematic structural diagram of a foldable support according to another embodiment of the present disclosure.

According to an embodiment of the present disclosure, when the sidewall of the recessed portion has a convex structure 1211, the convex structure 1211 may be an axisymmetric structure, that is, the convex structure 1211 may be axisymmetric along the plane where the metal layer is located (see FIG. 6). At this time, the plane where the metal layer is located is the plane N passing through the concave point A, which is a point where two sides of the recessed structure 1212 intersect, or the convex structure 1211 may also be a non-axisymmetric structure (see FIG. 7), which is not limited herein.

Figure 8:
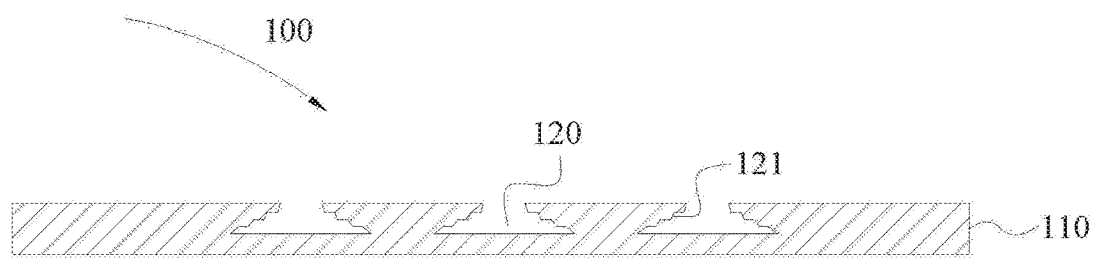
FIG. 8 is a schematic structural diagram of a foldable support according to another embodiment of the present disclosure.
Figure 9:
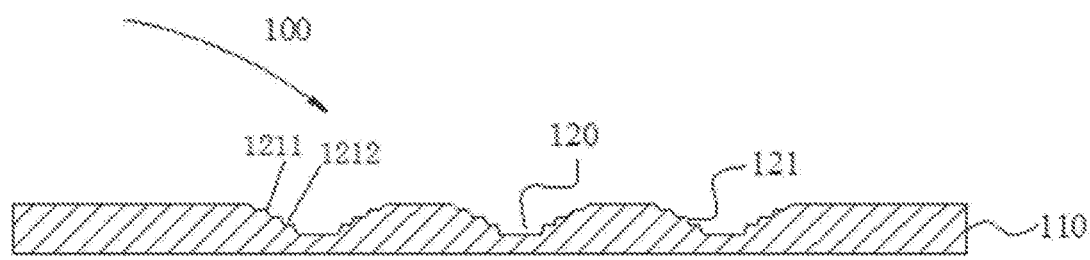
FIG. 9 is a schematic structural diagram of a foldable support according to another embodiment of the present disclosure.

According to other embodiments of the present disclosure, the sidewall 121 of the recessed portion 120 may be further provided with a plurality of recessed structures 1212 and a plurality of convex structures 1211 (see FIG. 8 and FIG. 9). As a result, the path of stress release of the metal layer can be further increased, and the ability of the metal layer to disperse stress can be further improved. For example, the sidewall may have a step-like shape.

The shape of the cross section of the recessed portion (for example, the cross section along the plane where the metal layer is located) is not particularly limited, for example, according to an embodiment of the present disclosure. For instance, the cross-sectional shape of the recessed portion may include at least one of circle, oval, and polygon. Specifically, the cross-sectional shapes of the recessed portion may be a square, a rectangle, a diamond, or a hexagon. More specifically, for example, the cross-sectional shape of each of the plurality of recessed portions is rectangular, or the cross-sectional shapes of a portion of the plurality of recessed portions are circular, and the cross-sectional shapes of the other portion of the recessed portions are oval, which are not listed in detail herein.

According to an embodiment of the present disclosure, referring to FIG. 3, the minimum value of the cross-sectional width L (i.e., the cross-sectional width of the opening) of the recessed portion 120 may be 0.1-1 mm, such as 0.1 mm, 0.2 mm, 0.3 mm, 0.4 mm, 0.5 mm, 0.6 mm, 0.7 mm, 0.8 mm, 0.9 mm, or 1 mm. The inventor found that when the minimum value of the cross-sectional width of the recessed portion is less than 0.1 mm, the bending stress released by the recessed portion is relatively smaller, and the improvement of the bending performance of the foldable support is limited. When the minimum value of the cross-sectional width of the recessed portion is greater than 1 mm, the flexible display panel is likely to be recessed because the recessed portion is too large. By setting the minimum value of the cross-sectional width of the recessed portion within the above range, the present disclosure can not only significantly improve the ability to dissipate stress in the recessed portion, but can also provide a good supporting role on the flexible display panel, such that the flexible display panel achieves a good display effect.

According to an embodiment of the present disclosure, the spacing between adjacent recessed portions may be consistent, that is, the cross-sectional widths of the plurality of connecting portions are consistent. Therefore, the portion of the metal layer located in the bending region can be more uniformly stressed during bending, and the bending effect of the foldable support can be further improved.

According to an embodiment of the present disclosure, the material constituting the metal layer 110 may include at least one of special steel (such as stainless steel or other types of special steel), nickel, titanium, nickel alloy, titanium alloy, and copper alloy, but is not limited to the above materials. Therefore, the above described material has a high degree of hardness, and the foldable support can have good supporting performance.

According to an embodiment of the present disclosure, the thickness of the metal layer 110 may be 0.015 to 0.5 mm, such as 0.015 mm, 0.03 mm, 0.05 mm, 0.08 mm, 0.1 mm, 0.2 mm, 0.3 mm, 0.4 mm, or 0.5 mm. Therefore, setting the thickness of the metal layer within the above range can ensure that the metal layer has better bending performance and supporting performance.

According to an embodiment of the present disclosure, the foldable support may further include: a buffer structure, where at least a portion of the buffer structure is located in the recessed portions. The buffer structure may be made of a polymer material with a high resilience. As the buffer structure can be deformed, for instance when the foldable support is bent, a plurality of recessed portions can be deformed along with the bending of the foldable support. Also, when the foldable support is restored to flatness after being bent, the plurality of recessed portions can be rebounded to the original state, which plays a good buffer function and can further improve the bending performance of the foldable support and performance of restoring the flatness after bending.

Figure 10:
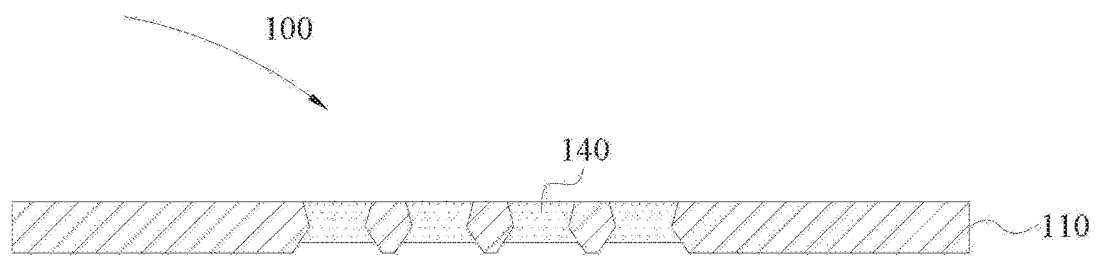
FIG. 10 is a schematic structural diagram of a foldable support according to another embodiment of the present disclosure.
Figure 11:
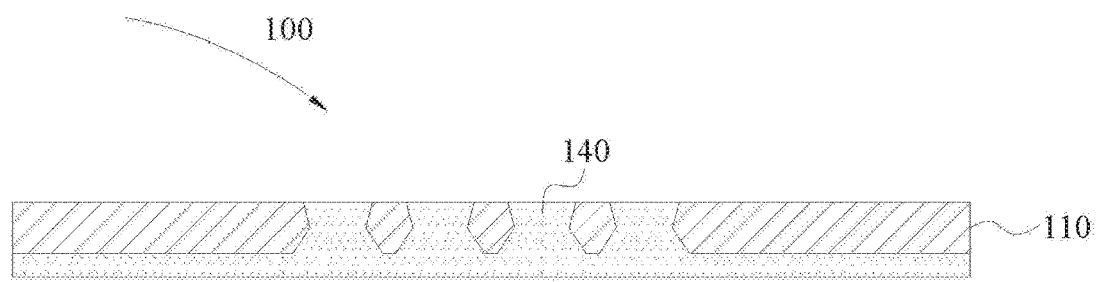
FIG. 11 is a schematic structural diagram of a foldable support according to another embodiment of the present disclosure.
Figure 12:
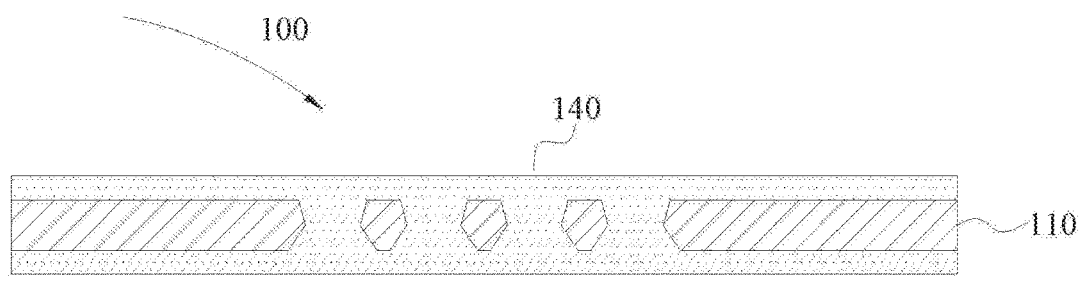
FIG. 12 is a schematic structural diagram of a foldable support according to another embodiment of the present disclosure.

Specifically, referring to FIG. 10, the buffer structure 140 may be filled in the recessed portions, and the buffer structure 140 may fill only a part of the recessed portions. Therefore, the buffer structure can play a good buffer function. Alternatively, referring to FIG. 11, the buffer structure 140 is not only filled in the recessed portions, but also located on a side surface of the metal layer 110. Therefore, the buffer structure can not only play a good buffer function, but also provide a flat surface for other structures provided on the metal layer side. Alternatively, referring to FIG. 12, the buffer structure 140 is not only filled in the recessed portions, but also on surfaces on both sides of the metal layer 110. Therefore, the buffer structure can not only play a good buffer function, but also provide a flat surface for other structures provided on both sides of the metal layer. For example, the buffer structure on one side of the metal layer can provide a flat contact surface for the flexible display panel, and the buffer structure on the other side can provide a flat contact surface for other functional parts.

In another aspect of the present disclosure, the present disclosure provides a method for fabricating a foldable support. According to an embodiment of the present disclosure, the foldable support fabricated by the method may be the foldable support described above. Therefore, the foldable support fabricated by the method has the same features and advantages as the foldable support described above, and is not repeated here.

Figure 13:
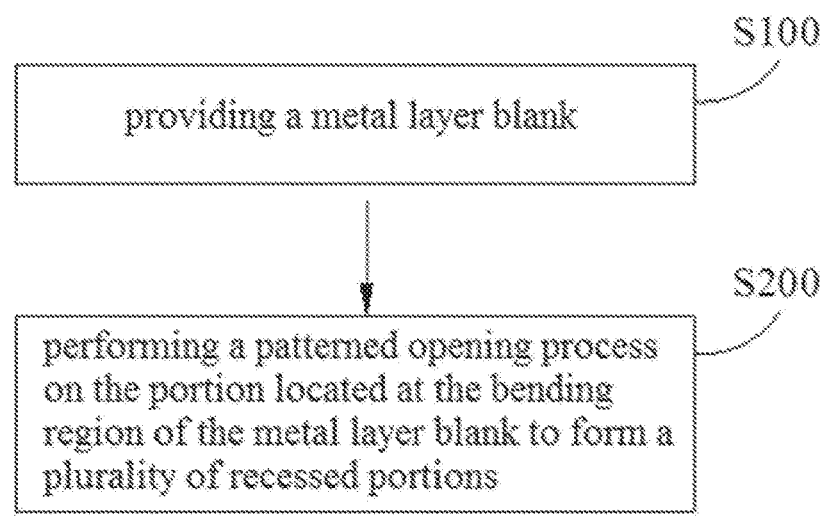
FIG. 13 is a flowchart of a method for fabricating a foldable support according to an embodiment of the present disclosure.

According to an embodiment of the present disclosure, referring to FIG. 13, the method includes:

S100: providing a metal layer blank.

According to an embodiment of the present disclosure, in this step, a metal layer blank is provided. The constituent materials and thickness of the metal layer blank have been described in detail above, and will not be repeated here.

According to an embodiment of the present disclosure, the metal layer blank is provided with a non-bending region and at least one bending region. After subsequent steps, a plurality of recessed portions can be formed in the bending region of the metal layer blank, where at least one sidewall of the recessed portion is not perpendicular to the plane where the metal layer blank is located. Therefore, the bending performance of the foldable support and the performance of restoring flatness after bending are also effectively improved, which can effectively improve the problem of peeling between the flexible display panel and the foldable support and improve the occurrence of folds of the foldable support problem.

S200: performing a patterned opening process on the portion located at the bending region of the metal layer blank to form a plurality of recessed portions.

According to an embodiment of the present disclosure, in the step, performing a patterned opening process on the portion located at the bending region of the metal layer blank forms a plurality of recessed portions. According to an embodiment of the present disclosure, at least one of sidewalls of the recessed portion is not perpendicular to the plane where the metal layer blank is located, that is, the sidewalls of the recessed portions have a certain slope, which can improve the ability of the foldable support to withstand bending and make the foldable support obtain good bending performance and strong performance of restoring flatness after being bent.

The angle between the sidewalls of the recessed portions and the plane where the metal layer blank is located has been described in detail above, and is not repeated here.

According to an embodiment of the present disclosure, the patterning process may be wet etching, By controlling the parameters such as the concentration of the etching solution, the time of the etching and the contact method of the etching solution, or using an etching method that is masked in multiple time and steps, the angle between the sidewalls of the recessed portions and the plane where the metal layer blank is located can be adjusted to obtain foldable supports with different degrees of bending.

According to an embodiment of the present disclosure, a recessed portion having a plurality of convex structures and a plurality of recessed structures on a sidewall can be formed through multiple etchings. Specifically, the recessed portion having a convex structure on the sidewall may be formed by the following steps: first, performing a first etching on one side of the metal layer blank to form a first hollow portion with a certain slope on the side wall; and subsequently, performing a second etching on the other side of the metal layer blank after the first etching to form a second hollow portion having a certain slope on the side wall and communicating with the first hollow portion so as to obtain a recessed portion of which the side wall having a convex structure (see FIGS. 6 and 7).

According to an embodiment of the present disclosure, the recessed portion having a plurality of recessed structures and a plurality of convex structures on the side wall may be formed by etching process that is masked in multiple times and steps. Taking the structure in FIG. 9 as an example, first, one side of the metal layer blank is masked for the first time, and a first etching is performed. Then, on the same side of the metal layer blank after the first etching is masked for the second time, a second etching is performed, and the area masked for the second time is larger than the area masked for the first time, that is, a portion masked for the second time also covers the sidewall formed by the first etching and a part of the plane formed by the first etching to protect the sidewall and the masked part of the plane from being etched during the second etching. After performing multiple etchings in this manner, as shown in FIG. 9, a recessed portion having a plurality of recessed structures and a plurality of convex structures is formed on the sidewall.

Taking the structure in FIG. 8 as an example, first, one side of the metal layer blank is masked for the first time, and the first etching is performed. Then, on the same side of the metal layer blank after the first etching is masked for the second time, and a second etching is performed, and the area masked for the second time is larger than the area masked for the first time, that is, a portion masked for the second time also covers the sidewall formed by the first etching, and the concentration of the etching solution used in the second etching is greater than the concentration of the etching solution used in the first etching, so that the width of the second etching is larger than that of the first etching. After performing multiple etchings in this manner, a recessed portion having a plurality of recessed structures and a plurality of convex structures is formed on the side wall as shown in FIG. 8

In another aspect of the present disclosure, the present disclosure provides a display device. According to an embodiment of the present disclosure, referring to FIG. 14, the display device includes: a flexible display panel 200 and a foldable support 100. In one embodiment, the foldable support 100 is the foldable support described above, and the foldable support 100 is located on a side facing away from the display surface 210 of the flexible display panel 200. Therefore, the display device has a good folding effect and a good display effect.

Figure 14:
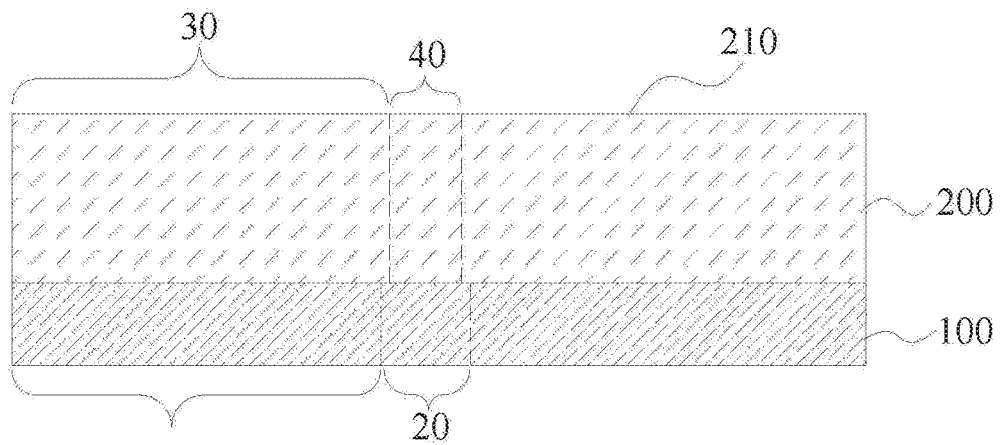
FIG. 14 is a schematic structural diagram of a display device according to an embodiment of the present disclosure.
Figure 15:
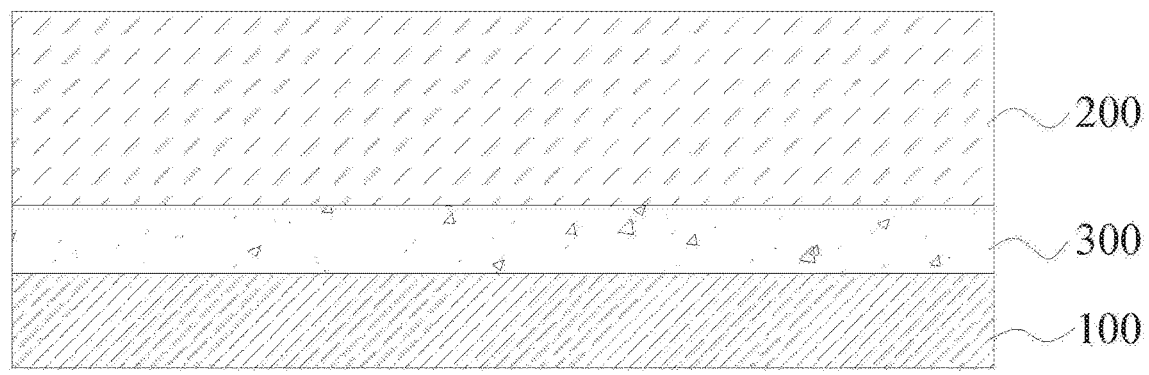
FIG. 15 is a schematic structural diagram of a display device according to another embodiment of the present disclosure.

According to an embodiment of the present disclosure, the foldable support 100 may directly contact the flexible display panel 200 (see FIG. 14). Alternatively, a flat layer 300 (see FIG. 15) may be further provided between the foldable support 100 and the flexible display panel 200. Therefore, the flat layer can provide a flat contact surface for the flexible display panel, and avoid the uneven structure of the bending region of the foldable support from adversely affecting the display effect of the flexible display panel. According to an embodiment of the present disclosure, referring to FIG. 11, when the buffer structure 140 is filled in the recessed portions and is located on surfaces of the two sides of the metal layer 110, the foldable support can directly contact the flexible display panel, and the buffer structure located between the metal layer and the flexible display panel can be used as a flat layer to provide a flat contact surface for the flexible display panel. The material constituting the flat layer is not particularly limited. For example, according to an embodiment of the present disclosure, a material having a low heat transfer coefficient, such as rubber, epoxy, or the like, may be used for the flat layer.

Figure 16:
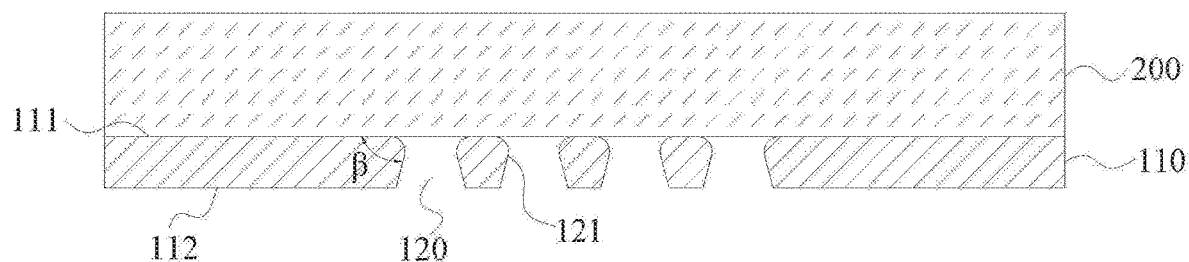
FIG. 16 is a schematic structural diagram of a display device according to another embodiment of the present disclosure.

According to an embodiment of the present disclosure, referring to FIG. 16, the metal layer 110 is provided with a first surface 111 and a second surface 112, the first surface 111 is disposed near the flexible display panel 200, and the second surface 112 is disposed away from the flexible display panel 200, an included angle β between the sidewall of the recessed portion 120 and the first surface 111 is a rounded corner. If the included angle between the sidewall of the recessed portion and the first surface is sharp, it is easy to form a top mark or even a scratch on the area of flexible display panel corresponding to this part during bending, which affects the display of the flexible display panel. The present disclosure can effectively improve the above problems by arranging the included angle as a rounded corner. In this embodiment, the recessed portion 120 may extend through the metal layer, or the depth of the recessed portion 120 is smaller than the thickness of the metal layer, that is, the recessed portion 120 is located on one side of the first surface 111, and the second surface 112 has no recessed portion (this situation is not shown in the figure). In the embodiment, the foldable support may directly contact the flexible display panel (see FIG. 6), or a flat layer may be provided between the foldable support and the flexible display panel.

According to an embodiment, when the recessed portions are configured to extend through the metal layer, the side with a larger cross-sectional area of the recessed portion (that is, the side with a larger opening width) may be disposed near to the flexible display panel, or the side with a smaller cross-sectional area of the recessed portion (that is, the side with a smaller opening width) may be disposed near to the flexible display panel. In one embodiment, the side with a smaller cross-sectional area of the recessed portion is disposed near to the flexible display panel (see FIG. 16). Therefore, the foldable support can provide a larger support surface for the flexible display panel, and the flexible display panel can have a smaller amount of deformation under the same stress, which further improves the folding effect and display effect of the display device.

According to an embodiment of the present disclosure, when the depth of the recessed portion is smaller than the thickness of the metal layer, the side where the metal layer is provided with the recessed portion may be disposed near the flexible display panel, or the side of the metal layer on which the recessed portion is not provided may be disposed close to the flexible display panel. In one embodiment, the side where the metal layer is not provided with the recessed portion is disposed close to the flexible display panel (this situation is not shown in the figure). Therefore, the foldable support can provide a larger support surface for the flexible display panel, and the flexible display panel can have a smaller amount of deformation under the same stress, which further improves the folding effect and display effect of the display device.

According to an embodiment of the present disclosure, referring to FIG. 14, the flexible display panel 200 is provided with a non-bending region 30 and at least one bending region 40 (only one bending region 40 is shown in the figure). The orthographic projection of the bending region 40 of the flexible display panel 200 on the foldable support 100 is within the range of the bending region 20 of the foldable support 100. Therefore, it is possible to ensure that the bending of the foldable support matches the bending of the flexible display panel, and at the same time, it has a good supporting effect on the flexible display panel.

The following describes the solution of the present disclosure through specific embodiments. It should be noted that the following embodiments are only used to illustrate the present disclosure, and should not be regarded as limiting the scope of the present disclosure. If the specific technology or condition is not indicated in the embodiment, technology or conditions described in the literature in the art or according to the product specifications can be performed.

Embodiment 1

The foldable support includes a metal layer, the metal layer is provided with a bending region, where a portion of the metal layer located at the bending region has a plurality of recessed portions extending through the metal layer. The recessed portions are filled with air, and the included angle between the sidewalls of the recessed portions and the plane where the metal layer is located is 45 degrees (see FIG. 3).

When the foldable support is bonded to the flexible display panel, the side with the smaller cross-sectional area of the recessed portions of the foldable support is disposed near the flexible display panel.

Embodiment 2

The foldable support includes a metal layer, the metal layer is provide with a bending region, a portion of the metal layer located at the bending region has a plurality of recessed portions, the depth of the recessed portion is half of the thickness of the metal layer, the recessed portion is filled with air, and the included angle between the sidewall of the recessed portion and the plane where the metal layer is located is 45 degrees (see FIG. 1).

When the foldable support is bonded to the flexible display panel, the side of the foldable support that is not provided with a recessed portion is disposed near the flexible display panel.

Embodiment 3

The foldable support includes a metal layer, the metal layer is provided with a bending region, a portion of the metal layer located at the bending region has a plurality of recessed portions extending through the metal layer, the sidewall of the recessed portion has a convex structure 1211, and the convex structure is axisymmetric, and the recessed portions are filled with air, an included angle between a part of the side wall of the recessed portion and the plane where the metal layer is located is 45 degrees, and an included angle between the other part of the side wall of the recessed portion and the plane where the metal layer is located is 135 degrees (see FIG. 6).

When the foldable support is bonded to the flexible display panel, a side of the foldable support (such as a side at an angle of 45 degrees between the sidewall of the recessed portion and the plane where the metal layer is located) is disposed near the flexible display panel.

Embodiment 4

The foldable support includes a metal layer, the metal layer is provided with a bending region, a portion of the metal layer located at the bending region has a plurality of recessed portions extending through the metal layer, the sidewall of the recessed portion is in a shape of step and the recessed portions are filled with air. The included angle between the sidewalls of the recessed portions (the line between the highest point and the lowest point of the sidewall) and the plane where the metal layer is located is 135 degrees (see FIG. 9).

When the foldable support is bonded to the flexible display panel, the side of the foldable support that is not provided with a recessed portion is disposed near the flexible display panel.

Embodiment 5

The foldable support includes a metal layer, the metal layer is provided with a bending region, a portion of the metal layer located at the bending region has a plurality of recessed portions extending through the metal layer, the sidewall of the recessed portion has a convex structure 1211, and the convex structure 1211 is not axisymmetric. The recessed portion is filled with a buffer structure. An included angle between a part of the sidewall of the recessed portion and the plane where the metal layer is located is 60 degrees, and an included angle between the other part of the sidewall of the recessed portion and the plane where the metal layer is located is 135 degrees (see FIG. 10)

When the foldable support is bonded to the flexible display panel, the side with a smaller cross-sectional area of the recessed portions of the foldable support is disposed near the flexible display panel.

COMPARATIVE EXAMPLE 1

The foldable support includes a metal layer, the metal layer is provided with a bending region, a portion of the metal layer located at the bending region is provided with a plurality of recessed portions extending through the metal layer, the recessed portions are filled with air, and the included angle between the sidewalls of the recessed portions and the plane where the metal layer is located is 90 degrees.

When the foldable support is bonded to the flexible display panel, one of two sides where the foldable support is provided with the recessed portions is disposed near the flexible display panel.

Performance Testing:

Bending experiments are performed on the foldable supports of Embodiments 1-5 and Comparative Example 1, respectively:

The "inward" and "outward" of the inward fold/outward fold mainly represent the location of the flexible display panel. For example, the inward fold is that the flexible display panel is located in the inward side of the bend when bending.

The foldable support of Embodiment 1 (see FIG. 3) can be folded 180 degrees outwards and 150 degrees inwardly, and no metal layer damage and abnormal protrusions have occurred.

The foldable support of Embodiment 2 (see FIG. 1) can be folded 120 degrees outwards and 150 degrees inwardly, and no metal layer damage and abnormal protrusions have occurred.

The foldable support of Embodiment 3 (see FIG. 6) can be bent 180 degrees on both sides, and no metal layer damage and abnormal protrusions have occurred.

The foldable support of Embodiment 4 (see FIG. 9) can be folded 120 degrees outwards and 160 degrees inwardly, and no metal layer damage and abnormal protrusions have occurred.

The foldable support of Embodiment 5 (see FIG. 10) can be bent 180 degrees on both sides, and no metal layer damage and abnormal protrusions have occurred.

In Comparative Example 1, two foldable supports are selected. When one of the foldable supports is folded 120 degrees outwards, the metal layer is damaged, when the other foldable support is folded 120 degrees inwardly, the metal layer is also damaged.

In the description of the present disclosure, the orientations or positional relationships indicated by the terms "up", "down" and the like are based on the orientations or positional relationships shown in the accompanying drawings, which is only for the convenience of describing the disclosure and does not require that the disclosure must be constructed and operated in a specific orientation, so it cannot be understood as a limitation on the disclosure.

In the description of this specification, the description with reference to the terms "one embodiment", "another embodiment", etc. means that a specific feature, structure, material, or characteristic described in conjunction with the embodiment is included in at least one embodiment of the present disclosure. In this specification, the schematic expressions of the above terms are not necessarily directed to the same embodiment or example. Moreover, the particular features, structures, materials, or characteristics described may be combined in any suitable manner in any one or more embodiments or examples. In addition, without any contradiction, those skilled in the art may incorporate and combine different embodiments or examples and features of the different embodiments or examples described in this specification. In addition, it should be noted that in this specification, the terms "first" and "second" are used for description purposes only, and cannot be understood as indicating or implying relative importance or implicitly indicating the number of technical features indicated.

Although the embodiments of the present disclosure have been shown and described above, it can be understood that the above embodiments are exemplary and should not be construed as limitations on the present disclosure. Those skilled in the art can make changes, modifications, replacements, and variations to the above described embodiments within the scope of the present disclosure.

What is claimed is:

1. A foldable support, comprising:
a metal layer having a non-bending region and at least one bending region, wherein:
the metal layer comprises a plurality of recessed portions at the at least one bending region;
at least one of sidewalls of the plurality of recessed portions is not perpendicular to a plane where the metal layer is located, the metal layer comprises a first surface and a second surface, the first surface is configured to be disposed near a flexible display panel to provide a flat support function for the flexible display panel, the second surface is disposed away from the flexible display panel, and an included angle between the sidewalls of the recessed portions and the first surface is a rounded corner; and
the flexible display panel has a non-bending region and at least one bending region, wherein an orthographic projection of the at least one bending region of the flexible display panel on the metal layer is within the range of an orthographic projection of the bending region of the metal layer on the metal layer, and a thickness of the metal layer is 0.015-0.05 mm.

2. The foldable support of claim 1, wherein the recessed portions are configured to extend through the metal layer.

3. The foldable support of claim 1, wherein a depth of the recessed portions is smaller than the thickness of the metal layer.

4. The foldable support of claim 1, wherein an included angle a between the sidewalls of the recessed portions and the plane where the metal layer is located satisfies: 20 degrees≤α<90 degrees; or, 90 degrees<α≤160 degrees.

5. The foldable support of claim 1, wherein the sidewalls of the recessed portions comprise at least one convex structure.

6. The foldable support of claim 1, wherein the sidewalls of the recessed portions comprise at least one recessed structure.

7. The foldable support of claim 1, wherein a minimum value of a cross-sectional width of one recessed portion is 0.1 to 1 mm.

8. The foldable support of claim 7, wherein a cross-sectional shape of the recessed portions comprises at least one of a circle, an oval, and a polygon.

9. The foldable support of claim 1, wherein a cross-sectional shape of the recessed portions comprises at least one of a circle, an oval, and a polygon.

10. The foldable support of claim 1, wherein a material constituting the metal layer comprises at least one of: special steel, nickel, titanium, nickel alloy, titanium alloy, and copper alloy.

11. The foldable support of claim 1, wherein the foldable support further comprises a buffer structure, at least a portion of the buffer structure being located in the recessed portions.

12. The foldable support of claim 1, wherein the plurality of recessed portions are arranged in a plurality of rows, two adjacent rows of the plurality of recessed portions are staggered, and two rows of the plurality of recessed portions arranged in alternate rows are aligned.

13. A display device, comprising:
- a flexible display panel and a foldable support, the foldable support comprising a metal layer having a non-bending region and at least one bending region, wherein:
- the metal layer comprises a plurality of recessed portions at the at least one bending region;
- at least one of sidewalls of the plurality of recessed portions is not perpendicular to a plane where the metal layer is located;
- the foldable support is located on a side facing away from the display surface of the flexible display panel; and
- the metal layer comprises a first surface and a second surface, the first surface being disposed near the flexible display panel, and the second surface being disposed away from the flexible display panel, and an included angle between the sidewalls of the recessed portions and the first surface being a rounded corner; and
- the flexible display panel has a non-bending region and at least one bending region, wherein an orthographic projection of the at least one bending region of the flexible display panel on the metal layer is within the range of an orthographic projection of the bending region of the metal layer on the metal layer, and a thickness of the metal layer is 0.015-0.05 mm.

14. The display device of claim 13, wherein the display device further comprises a flat layer disposed between the foldable support and the flexible display panel.

15. The display device of claim 13, wherein the recessed portions are configured to extend through the metal layer, and a side with a smaller cross-sectional area of the recessed portions is disposed near the flexible display panel.

16. The display device of claim 13, wherein a depth of the recessed portions is smaller than a thickness of the metal layer, and one side of the metal layer where the recessed portions are located is disposed away from the flexible display panel.

* * * * *